Nov. 1, 1927.
H. A. SALLOP
AUTOMOBILE SEAT COVER FASTENER
Filed April 13, 1927
1,647,934
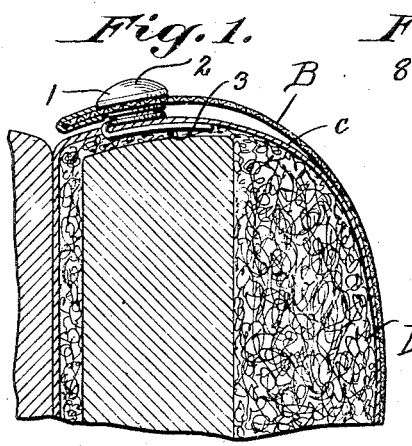
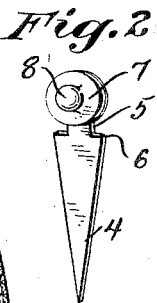
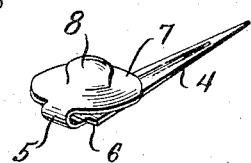
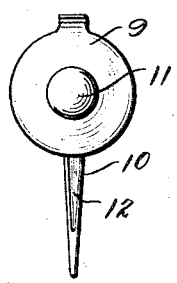
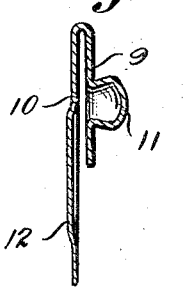
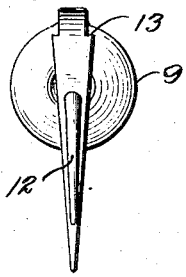
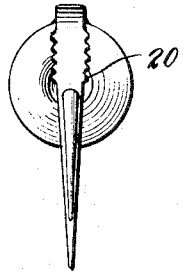
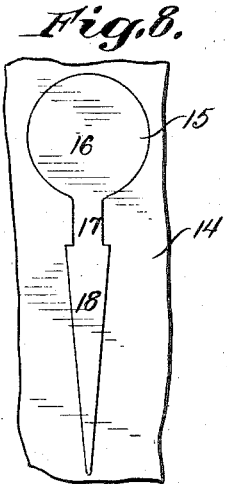
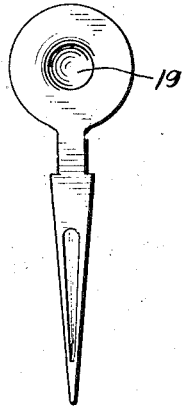
Harry A. Sallop, INVENTOR.
BY Richard B. Owen
ATTORNEYS.
WITNESSES
F. G. Radman
Wm R. Smith Patented Nov. 1, 1927.

1,647,934

UNITED STATES PATENT OFFICE.

HARRY A. SALLOP, OF NEW YORK, N. Y.

AUTOMOBILE SEAT-COVER FASTENER.

Application filed April 13, 1927. Serial No. 183,577.

This invention relates to a fastener and more particularly to a construction of fastener to attach seat covers to automobile seats, and has for its primary object the construction of a device that not only facilitates the proper attachment of the covers to the seat but will be secured to the seat proper to be readily detached.

An object of the invention is the construction of a fastener of a design to penetrate the upholstery of the seat and to assume a final position paralleling the inner surface of the upholstery of the seat so that the fastener will so interlock with the upholstery that the usual strain connected with the stretching of the seat covers will increase the effective engagement between the fastener and the seat.

Another object of the invention is the design of a fastener that may be cheaply manufactured and which can be effectively interlocked with the seat upholstery and which includes in its construction snap elements, thereby enabling the covers to be readily removed when found necessary.

A feature of the invention is the construction of a fastener of two elements having a snap connection, one permanently carried by the seat cover, the other detachably secured to the upholstery of the seat.

Besides the above, my invention is distinguished in the construction of a fastener that interlocks with the upholstery of the seat in a direction at right angles to the direction of strain of the seat cover when stretched taut over the surface of the seat.

With these and other objects in view, my invention will be better understood from a description of the same when taken in connection with the accompanying drawing, wherein:—

Figure 1 is a sectional view of a portion of a seat and a cover therefor showing the application of my improved fastener;

Figure 2 is a perspective view of one section of the button;

Figure 3 is a perspective view illustrating the head bent into parallelism with the shank;

Figure 4 is a perspective view of a simplified form of the invention;

Figure 5 is a front elevation thereof;

Figure 6 is a vertical sectional view of a modification;

Figure 7 is a rear elevation of the modification;

Figures 8 and 9 illustrate in a diagrammatic manner the method of manufacturing the fastener;

Figure 10 is a rear elevation of another form of the invention.

Again referring to the drawing illustrating a few of the many forms of my invention as originally set forth and claimed in my co-pending application filed January 21, 1926, Serial #82,822, and more particularly to Figures 1, 2 and 3, it will be noted that my improved snap fastener, designated in its entirety by the numeral 1, consists of companion members or sections 2 and 3, the former constructed as a socket member permanently secured to the cover B and the latter in the form of a ball member detachably interlocking with the upholstery C of the seat D. The fastening element or member 3 forming an important part of my invention is constructed to provide a spear-shaped shank or pin 4 having a restricted neck portion 5 a continuation of the shank 4, and providing a pair of shoulders 6 for abutting engagement with the upholstery after the shank has penetrated the same.

Associated with the neck 5 is a head 7 provided with a ball 8 for snap engagement with the button or socket section 2. Referring to Figure 3, it will be noted that in the final construction of the fastener, the head parallels the shank due to the loop formation of the neck and thus the shank is enabled to be positioned in parallelism with the under surface of the upholstery, as shown in Figure 1, to have an interlocking engagement therewith with the head positioned for yieldable movement toward and away from the shank so as to facilitate the insertion of the fastener into the upholstery and the snapping of the socket member in place.

Referring to Figure 1, it will be appreciated that after the cover B has been stretched around the surface of the seat, the members may be snapped into engagement with each other and stretching action of the cover relied on to subject the member 3 to a pulling strain in a direction to increase the effective interlocking engagement between the neck, shoulder, shank and surfaces of the upholstery.

In Figures 4 to 7 inclusive, I have illustrated the head 9 formed integral with the shank 10 with the ball 11 struck from the head laterally thereof. The shank 10 may or may not be provided with a reinforcing rib 12 and shoulders 13 for interlocking engagement with the upholstery.

Figures 8 and 9 illustrate in a diagrammatic manner one method of manufacturing the fastener which consists in placing a sheet of metal 14 under a suitable stamping machine and stamping therefrom the blank 15 having the head 16 and neck 17 and shank 18. In the final stamping operation, the head may be formed with a depression 19 to provide the necessary ball. In Figure 10, I have shown the shank provided with a plurality of serrations 20 to increase the effective engagement between the shank and the upholstery.

From the foregoing description taken in connection with the accompanying drawing, it will be apparent that I provide a simplified construction of fastener that may be quickly inserted in place and when in place can be effectively secured to the button element carried by the covering so as to assure a neat fitting of the covering over the surface of the seat irrespective of the particular formation of the seat. It will also be appreciated that the design and construction of the various parts is such that the covers may be readily stretched and when stretched the members may be readily snapped into engagement with each other and the stretching action of the covers relied on to increase the effective binding engagement between the fastener and the upholstery. Although there is provided a rigid connection between the various element due to the direction of pull of the cover, the latter may be very readily removed by exerting a separating pull on the element in a direction at right angles to the cover and thus the cover may be readily removed when desired, and if desirable the fasteners may be readily disconnected from the seat.

It is, of course, to be understood that the fasteners may be constructed in various other shapes than illustrated and various other attaching features may be incorporated with the fastener and, therefore, I do not desire to be limited in any respect whatsoever except as set forth in the following claims.

I claim:—

1. A one-piece fastener stamped to provide a spear-shaped shank, a neck a continuation of the shank, and a head a continuation of the neck and paralleling the shank, said head being depressed to form integral therewith a ball.

2. A one-piece fastener stamped to provide a shank, a neck a continuation of the shank, a snap head a continuation of the neck and paralleling said shank for yieldable movements toward and away from the shank, and a ball formed integral with the head.

3. A fastener formed from a single piece of material to provide a shank, a head yieldably connected to and paralleling the shank, and a ball struck laterally and centrally of the head.

4. A fastener comprising a snap element and a penetrating prong curving from the edge of said element to extend in parallel spaced relation with approximately the entire under surface of said element.

5. A fastener comprising a snap element of disc formation and a penetrating prong curving away from the peripheral edge of said element to extend in spaced parallel relation with the entire under surface of said element and further to extend a predetermined distance beyond the element.

In testimony whereof I affix my signature.

HARRY A. SALLOP.